United States Patent
Perdikakis et al.

(10) Patent No.: US 9,774,275 B2
(45) Date of Patent: Sep. 26, 2017

(54) SYSTEMS AND METHODS FOR SPACE VECTOR PULSE WIDTH MODULATION SWITCHING USING BOOT-STRAP CHARGING CIRCUITS

(71) Applicant: Carrier Corporation, Farmington, CT (US)

(72) Inventors: William Perdikakis, Dublin, OH (US); Da Zhang, Bristol, CT (US); Thomas Gietzold, Waterford, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 14/422,772

(22) PCT Filed: Aug. 14, 2013

(86) PCT No.: PCT/US2013/054856
§ 371 (c)(1),
(2) Date: Feb. 20, 2015

(87) PCT Pub. No.: WO2014/031401
PCT Pub. Date: Feb. 27, 2014

(65) Prior Publication Data
US 2015/0236618 A1    Aug. 20, 2015

Related U.S. Application Data

(60) Provisional application No. 61/691,902, filed on Aug. 22, 2012.

(51) Int. Cl.
*G05B 11/28* (2006.01)
*H02M 7/5395* (2006.01)
*H02P 6/14* (2016.01)

(52) U.S. Cl.
CPC ............ *H02M 7/5395* (2013.01); *H02P 6/14* (2013.01)

(58) Field of Classification Search
CPC ........ H02P 27/08; H02P 27/085; H02P 27/05; H02P 27/06; H02P 2201/05; H02P 2201/09; H02P 21/00; H03F 2200/51
(Continued)

(56) References Cited

U.S. PATENT DOCUMENTS 5,483,140 A * 1/1996 Hess .................... H02M 5/4505
                                                       318/722
5,552,977 A     9/1996 Xu
(Continued)

FOREIGN PATENT DOCUMENTS

CN        201178376 Y    1/2009
EP        1770862 A1     4/2007

OTHER PUBLICATIONS

International Search Report for application PCT/US2013/054856, dated Oct. 28, 2014, 5 pages.
(Continued)

*Primary Examiner* — Bickey Dhakal
(74) *Attorney, Agent, or Firm* — Cantor Colburn LLP

(57) ABSTRACT

Platforms and techniques are provided for controlling a power inverter using space vector pulse width modulation (PWM) operation. The inverter converts a direct voltage (DC) power source to an alternating voltage (AC) output by controlling a set of three phase switches. A bootstrap capacitor is coupled to each switch. When each switch in the set of three phase switches is in a zero state, the coupled bootstrap capacitor can charge from the current delivered in a corresponding pulse width modulation (PWM) signal. The bootstrap capacitor can deliver stored power when a one (high) switch state is entered. Each switch can be maintained at a
(Continued)

zero state, and thus charge the bootstrap capacitor, for at least two consecutive segments of the PWM cycle. Precharging of the bootstrap capacitor is ensured before power delivery is required.

16 Claims, 3 Drawing Sheets

(58) Field of Classification Search
USPC .......................................................... 318/599
See application file for complete search history.

(56) References Cited

U.S. PATENT DOCUMENTS

| | | | |
|---|---|---|---|
| 6,147,887 A | 11/2000 | Miettinen | |
| 6,313,602 B1 | 11/2001 | Arefeen et al. | |
| 6,424,113 B1 | 7/2002 | Kelly et al. | |
| 6,643,149 B2 | 11/2003 | Arnet et al. | |
| 6,911,801 B2 | 6/2005 | Youm | |
| 6,950,321 B2* | 9/2005 | Stancu | H02M 1/12 363/40 |
| 7,053,587 B2 | 5/2006 | Ito et al. | |
| 7,075,267 B1 | 7/2006 | Cheng | |
| 7,558,089 B2 | 7/2009 | Mese et al. | |
| 7,738,267 B1 | 6/2010 | Tallam et al. | |
| 7,859,210 B2 | 12/2010 | Sakurai et al. | |
| 8,115,430 B2 | 2/2012 | Gallegos-Lopez et al. | |
| 2005/0152165 A1* | 7/2005 | Virolainen | H02M 7/5387 363/98 |
| 2007/0069236 A1 | 3/2007 | Capodivacca et al. | |
| 2007/0069668 A1* | 3/2007 | MacKay | H02P 6/10 318/400.34 |
| 2007/0164691 A1* | 7/2007 | MacKay | H02P 6/182 318/1 |
| 2008/0094023 A1* | 4/2008 | West | H02P 27/08 318/811 |
| 2010/0091534 A1 | 4/2010 | Tadano | |
| 2010/0149848 A1 | 6/2010 | Urushibata et al. | |
| 2011/0074489 A1 | 3/2011 | Viitanen | |
| 2011/0149621 A1 | 6/2011 | Damson | |
| 2011/0221365 A1 | 9/2011 | Gallegos-Lopez | |
| 2011/0221366 A1 | 9/2011 | Gallegos-Lopez | |
| 2011/0221367 A1 | 9/2011 | Perisic | |
| 2011/0299308 A1 | 12/2011 | Cheng et al. | |

OTHER PUBLICATIONS

Written Opinion for application PCT/US2013/054856, dated Oct. 28, 2014, 10 pages.
First Chinese Office Action and Search for application CN 201380042806.0, dated Nov. 4, 2016, 16 pages.

* cited by examiner

SYSTEMS AND METHODS FOR SPACE VECTOR PULSE WIDTH MODULATION SWITCHING USING BOOT-STRAP CHARGING CIRCUITS

FIELD

The present teachings relate to systems and methods for space vector pulse width modulation switching using bootstrap charging circuits, and more particularly, to platforms and techniques for sequencing the switching order of a set of phase switches in a space vector pulse width modulation-based power inverter to ensure sufficient charging of bootstrap gate capacitors to drive a desired three-phase output.

BACKGROUND

In the field of power electronics and control, the user of space vector pulse width modulation (PWM) techniques to control the generation and delivery of three phase voltage output from a direct voltage (DC) power source has been known. In such systems, the output signal can be, or can approximate, an alternating voltage and/or alternating current (AC) signal having three independent phases separated by one hundred twenty degrees. The three signals produced by such known space vector PWM platforms can be used to drive the inductors or other components of a motor or other output load. The use of space vector PWM techniques has permitted the control of three phase voltage to motors and other loads using relatively flexible and inexpensive programmed electronic control modules. In space vector PWM platforms, a set of space vectors, encoded as three-bit values, can be used to drive or control a set of three phase switches whose switching action can produce voltage levels that approximate an alternating voltage output in the three component phases. Voltage regulation for the management of power supplies in large home or other hardware, such as the electric motors used in heat pump, air conditioning, and other heating and cooling systems has been accomplished using space vector PWM controllers for some commercially available systems. Besides lower cost, such systems can also permit an enhanced degree of programmability in voltage, net power, and/or other parameters of the power supply platform and its output.

In the field of power electronics and other applications, it has likewise been known to use a type of power generation circuitry referred to as "bootstrap" capacitor or charging circuits. In bootstrap capacitor circuits, a set of capacitors can be coupled across different signal paths in electrical supply circuits, to parasitically tap the current in those circuits that flows during other operations. The bootstrap capacitor or capacitors build up charge as a result, and that stored charge can be used later to supply power to other circuits, and/or for other purposes. In cases, depending on load demands, the power delivered by a set of bootstrap capacitors can be used as a substitute for traditional transformers or other power supply elements. When bootstrap capacitor circuits are successfully used as a substitute for transformers or other power supply elements, significant cost savings can be achieved.

In the case of space vector PWM platforms, bootstrap capacitor power circuits could, potentially, form a useful alternative to transformer-based alternating voltage and/or alternating current (AC) power supplies, which tend to use large and expensive coil windings and other parts. In such a scenario, a set of bootstrap capacitors could potentially be inserted in the three phase switching circuitry, and draw current from that circuitry for storage and use when generating the inverted AC voltage output to drive the load.

Implementations to incorporate bootstrap capacitor circuitry in five-segment space vector PWM systems in which the PWM signals that drive the set of phase switches are reduced from a total of six clock cycles per segment (corresponding to one cycle per switch), to five clock cycles per segment to reduce the number of PWM state transitions and switching loss have, however, failed to materialize or become known in existing platforms. This may be due, in part, to the requirement in bootstrap capacitor circuitry that the signals from which each bootstrap capacitor draws current be in an "on" or flowing state for long enough to charge that capacitor by the time it is called upon to discharge and deliver power. In known five-segment space vector PWM systems, the rapid switching between off and on states in the set of (three) phase switches based on the cycling of conventional space vector sequences prevents any bootstrap capacitor from achieving a fully pre-charged state by the time that capacitor would be next called upon to discharge and deliver power.

It may be desirable to provide methods and systems for space vector pulse width modulation switching using bootstrap charging circuits, in which space vector PWM systems can be configured with bootstrap capacitor power circuitry, yet still provide the constituent capacitors adequate time to achieve the necessary level of charge to produce full three-phase output.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for space vector pulse width modulation switching using bootstrap charging circuits. More particularly, embodiments relate to platforms and techniques for incorporating a bootstrap charging circuit or circuits into a five-segment space vector PWM system, while configuring the firing sequence of the phase switches to drive the bootstrap capacitor(s) to full or sufficient charge to generate a desired three-phase output.

It should be noted that implementations of the signal generation platforms and techniques described herein relate to a voltage-controlled supply. In such implementations, the output of the inverter is a signal that represents a three-phase sinusoidal voltage. Since this technique requires no feedback, current levels and waveforms are not considered. In aspects, it is assumed that the load being driven by the inverter is selected such that sinusoidal currents are produced.

Reference will now be made in detail to exemplary embodiments of the present teachings, which are illustrated in the accompanying drawings. Where possible the same reference numbers will be used throughout the drawings to refer to the same or like parts.

Figure 1:
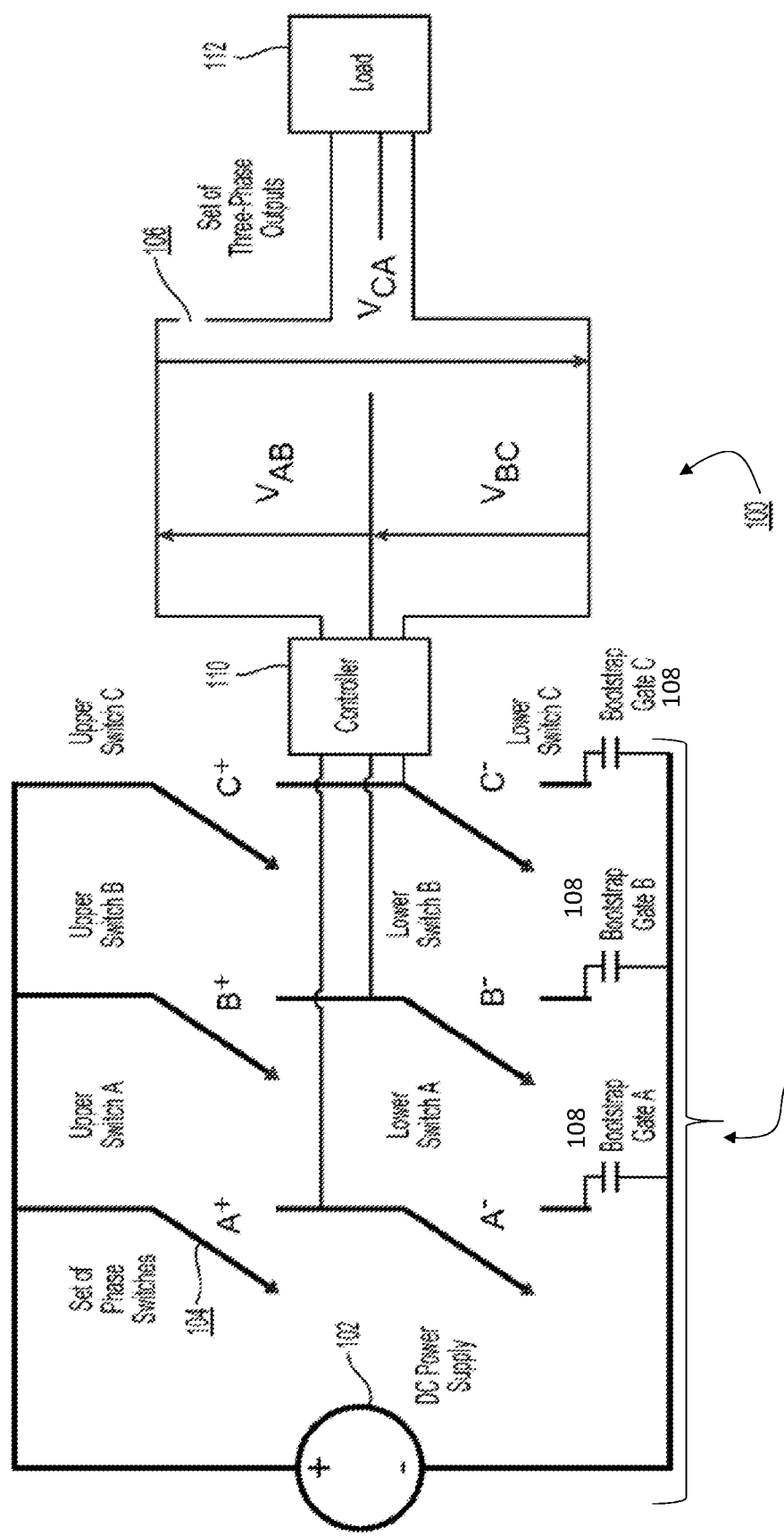
FIG. 1 illustrates an overall environment including control and switching circuitry which can be used in systems and methods for space vector pulse width modulation switching using bootstrap charging circuits, according to various embodiments.

FIG. 1 illustrates an overall system 100 in which systems and methods for space vector pulse width modulation switching using bootstrap charging circuits can operate, according to aspects. In aspects as shown, a power inverter module 122 hosted in the system 100 can contain, include, and/or interface to a direct voltage and/or direct current (DC) power supply 102, send voltage from that power supply through a set of phase switches 104, and generate a set of three-phase voltage outputs 106 to send to a load 112. In aspects, the direct voltage and/or direct current (DC) power supply 102 can be or include a power supply which generates direct voltage from a rectified alternating voltage and/or alternating current (AC) source, a battery-based direct voltage and/or direct current (DC) power supply, and/or other types of direct voltage and/or direct current (DC) power supplies or sources.

In aspects, the direct voltage and/or direct current (DC) power supply 102 can be coupled to the set of phase switches 104, which can be coupled to a controller 110. The set of phase switches 104 in implementations can, as shown, include a set of six switches (illustratively shown as A+ and A−, B+ and B−, and B+ and B−). In implementations, the set of phase switches 104 can comprise a set of transistors, such as a set of three insulated gate bipolar transistors (IGBTs), a set of three field effect transistors (FETs), and/or other types of transistors, configured to operate for instance in a switching mode. In aspects, the set of phase switches 104 can be or include discrete transistors, and/or can be incorporated in an integrated circuit (IC). Other types of switches, including those not constituting or based on transistors, can be used. Pairs of the six switches (labeled upper and lower, for each of the A, B, and C lines) illustrated in FIG. 1 can be configured to switch the voltage signal for one of three voltage output signals that are arranged to be one hundred twenty degrees apart in phase. In aspects, the switch for each phase can be configured to only allow the switch to close on the upper or lower side, to avoid shorting the switch. While three pairs of switches in the set of phase switches 104 are illustrated, it will be appreciated that other numbers, types, and/or configurations of switches can be used.

According to aspects, the controller 110, which can be or include a programmable logic device such as a microcontroller or a microprocessor, can manipulate the set of phase switches 104 to open and close the upper and lower switches for each switch line (A, B, and C). By opening and closing the set of phase switches 104 in switching sequence or pattern, the controller 110 can generate and/or transmit the set of three-phase voltage outputs to the load 112. According to aspects, the load 112 can be any of a variety of electrical loads, such as an electric motor. An electric motor used in the load 112 can be or include of an alternating (AC) induction motor, brushless direct (DC) motor, a switched reluctance motor, a permanent magnet synchronous motor, and/or other types of motors. In implementations, the load 112 can be or include an electric motor used in a heat pump and/or other heating, ventilating, or air conditioning (HVAC) system, and the system 100 can be installed or connected to that platform. It will be appreciated however that other types of load 112 and associated applications can be used.

According to aspects, the switching sequence or pattern generated or applied by the controller 110 can be a state vector pulse width modulation (PWM)-based sequence, in which triplets of one or zero values in the form (0,0,0), (1,0,0) and so forth can be used to encode or represent the one or off state of a pulse width modulation signal that constitutes or generates the set of three-phase outputs 106, which in turn drives the load 112. In implementations, the state vector PWM scheme used by the system 100 can be a five-segment state vector PWM configuration, in which the PWM signals that drive the set of phase switches 104 are reduced from a total of six clock cycles per segment (corresponding to one cycle per switch), to five clock cycles per segment to reduce the number of PWM state transitions. Reducing the number of PWM state transitions (e.g., from zero to one or one to zero) can result in improved energy efficiency, including less switching loss in the power inverter system. Other benefits can be realized.

In addition, besides the set of phase switches 104, the circuitry of the power inverter module 122 contained in the system 100 can include a set of bootstrap gate capacitors 108. The set of bootstrap gate capacitors 108 can be coupled across respective switching lines of the set of phase switches 104. In implementations as illustrated, the set of bootstrap gate capacitors 108 can comprise a set of three capacitors respectively coupled across the lower switch of each switching pair, and thus begin to charge when the switch (A, B, or C) is switched or closed in a low or zero state, and discharged when that switch is switched or closed in a high or one state. The electrical energy stored in the set of bootstrap gate capacitors 108 can then be used to drive the set of three-phase outputs 106, provided the set of bootstrap gate capacitors 108 can be charged to a sufficient level when each respective switch is switched into the high or one state. According to aspects of the present teachings, full or adequate charge on the set of bootstrap gate capacitors 108 can be achieved by definition of selected switching sequences in the space vector PWM switching sequence in the PWM cycle to maintain a comparatively long and continuous charge time on the set of bootstrap gate capacitors 108.

Figure 2B:
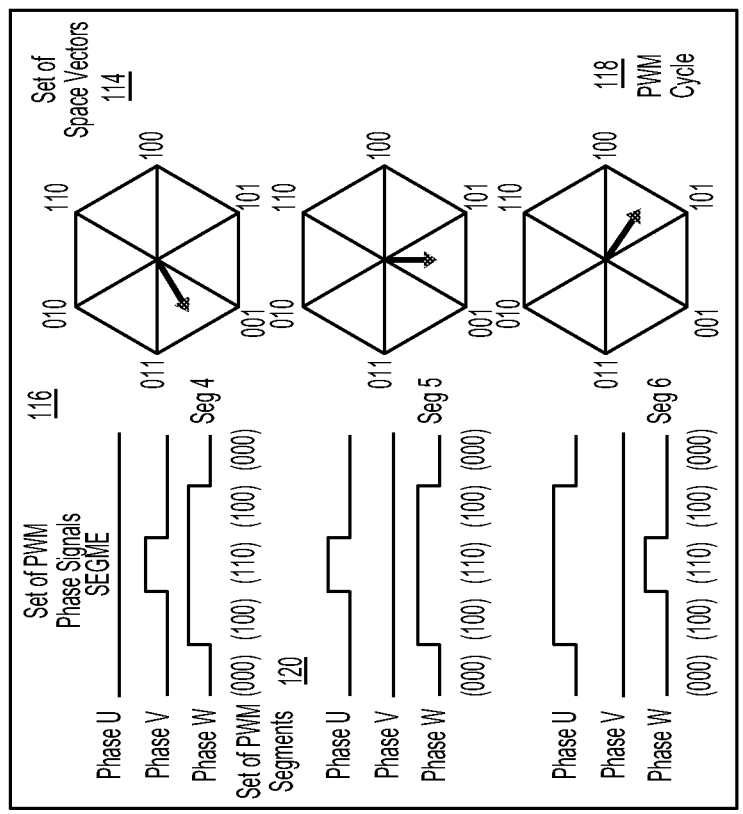
FIG. 2 illustrates a set of PWM phase signals that can be used across the set of PWM segments in a PWM cycle of a space vector PWM system, according to various embodiments.
Figure 2A:
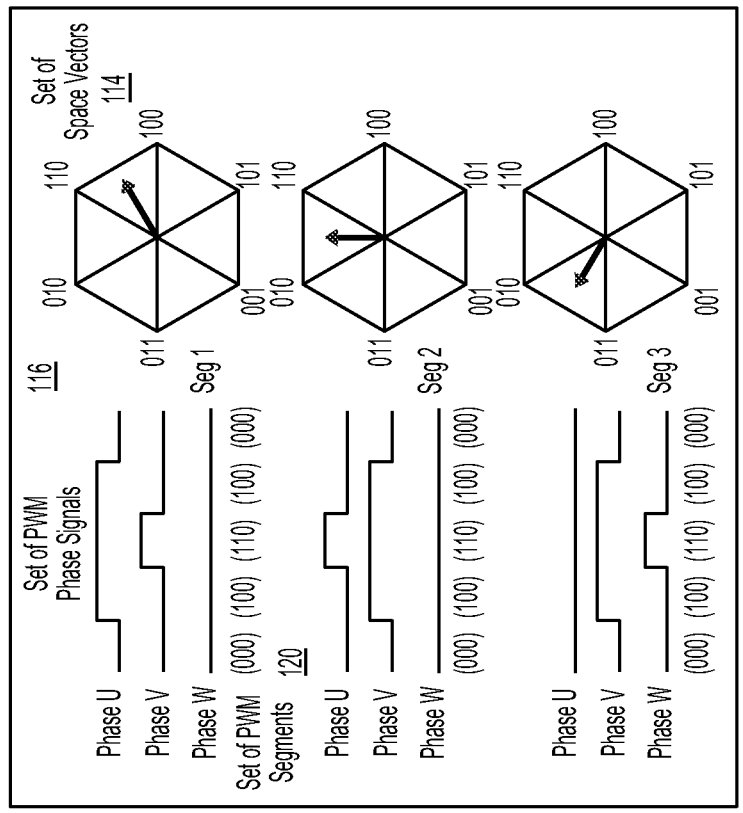

More specifically and as for instance illustrated in FIGS. 2A and 2B, the set of phase switches 104 can be driven by a set of PWM phase signals 116 in a PWM cycle 118. In implementations as shown, the overall PWM cycle 118 can comprise a set of PWM segments 120. As shown, the set of PWM segments 120 can include a set of six PWM segments, corresponding to the upper and lower cycles of each of the three power phases. The values of the set of PWM phase signals 116 in each segment can correspond to a rotating space vector (counterclockwise, (1,0,0) to (1,0,1)), along with two null vectors, (0,0,0) and (1,1,1). In aspects as shown, within each PWM segment, the set of PWM phase signals 116 can consist of U, V, and W signals in either a zero (low) or one (high) state. The combined zero (low) and one (high) states can correspond to the digits of the space vector representations of each of the three phases, and indicate the alternating voltage and/or alternating current (AC) output to be generated by controller 110. In aspects, it will be noted that each segment is constructed so that one of the phase signals (U, V, or W) is maintained in or at a zero (low) state for the entire segment. In implementations as shown, each PWM segment can be configured to comprise five clock periods or cycles. In aspects, the set of PWM phase signals 116 can assume different states or values in each of the five clock periods or cycles.

It will further be noted that for any two consecutive segments of the set of PWM phase signals 116, at least one of the phase signals is kept or maintained in a zero (low) state for the duration of both of those segments. According to aspects, maintaining at least one phase signal (out of the three) in or at a zero (low) state for the duration of at least two consecutive segments can ensure sufficient charge on the capacitor to deliver the power required in the output stage. In implementations, it may be noted that a given phase signal can also be maintained in the zero (low) state for at least a portion of an additional successive segment, beyond the first two segments. Thus, as shown, the W phase signal can be initiated in the zero (low) state in the first segment, maintained in the zero (low) state in the second segment, and be configured to remain in the zero (low) state until the third clock cycle of the third segment (again, out of five clock periods or cycles per segment in the illustrated implementation). The U and V phase signals can also be respectively maintained in the zero (low) state for two consecutive PWM segments, plus a portion of the following (third) consecutive segment, as shown. According to aspects, the charge on all three capacitors of the set of bootstrap gate capacitors 108, charged in this staggered fashion for those durations, can be maintained in a charged state to generate the set of three-phase voltage outputs 106 at levels sufficient in turn to drive the load 112.

According to aspects, it may again be noted that by rearranging or configuring the firing order of the set of phase switches 104 of the power inverter module 122 it is possible to eliminate switching on one of the phases for two consecutive segments, regardless of direction. In terms of efficiency, eliminating the switching of one phase signal during every PWM segment can effectively reduce the switching losses by up to 33%, compared to conventional SVPWM switching patterns. It may also be noted that in aspects as described and illustrated, each overall PWM cycle 118 starts and ends with all phases in the same or similar state, specifically, the zero vector (000). This feature can allow for bi-directional operation, without a need for on-the-fly modification to the space vector PWM switching pattern.

Figure 3:
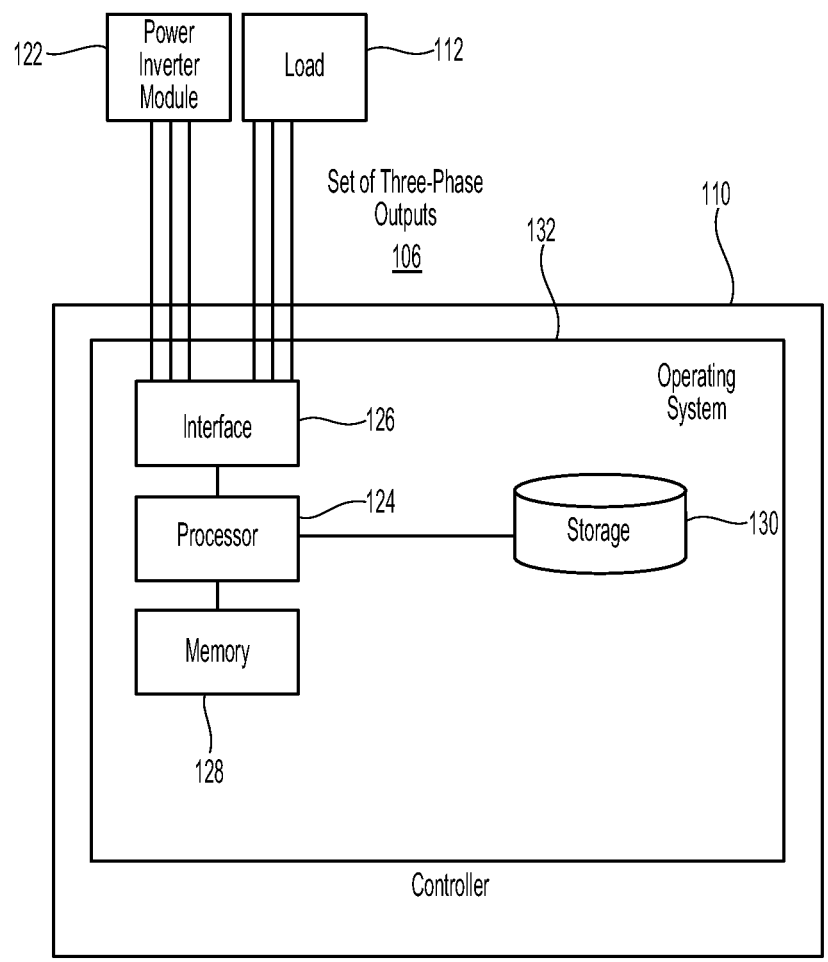
FIG. 3 illustrates exemplary hardware, software, and other resources that can be used in controller and other hardware in systems and methods for space vector pulse width modulation switching using bootstrap charging circuits, according to various embodiments.

FIG. 3 illustrates various hardware, software, and other resources that can be used in the controller 110 that can be incorporated in implementations of space vector pulse width modulation switching using bootstrap charging circuits, according to embodiments. In embodiments as shown, the controller 110 can comprise a platform including processor 124 communicating with memory 128, such as electronic random access memory, operating under control of or in conjunction with an operating system 130. The processor 124 in embodiments can be incorporated in one or more processors, embedded controllers, servers, clusters, and/or other computers or hardware resources, and/or can be implemented using cloud-based resources. The operating system 132 can be, for example, a distribution of the Linux™ operating system, the Unix™ operating system, an embedded operating system, and/or other open-source or proprietary operating system or platform. The processor 124 can communicate with storage 130, such as a database stored on a local hard drive or drive array, to access or store programmable logic to control the set of phase switches 104 and other elements of the power inverter module 122, and/or subsets of selections thereof, along with other content, media, or other data. The processor 124 can also communicate with an interface 126, such as bus, plane, and/or other connection, which in turn connects to or communicates with other circuitry of the power inverter module 122, the load 112, and/or other circuits, modules, and/or devices. The processor 124 can, in general, be programmed or configured to execute control logic and to control various processing operations, including to generate clock signals for, and/or synchronize the timing of, the PWM cycle 118, including its constituent set of PWM segments 120, along with other data, circuits, inputs, and/or outputs. Other configurations of the controller 110, associated interfaces and connections, and other hardware, software, and service resources are possible.

The foregoing description is illustrative, and variations in configuration and implementation may occur to persons skilled in the art. For example, while embodiments have been described in which the set of three-phase outputs 106 is delivered to a single load 112, in embodiments, the set of three-phase outputs 106 or multiples sets of three-phase output can be delivered, transmitted, and/or switched to multiple loads. Similarly, while embodiments have been described in which the set of bootstrap gate capacitors 108 comprises one capacitor per switching line, in embodiments, the set of bootstrap gate capacitors 108 can include two or more capacitors coupled to each switching line, and/or to other circuit elements or points. Conversely, in implementations, rather than using one capacitor per switching line, one capacitor coupled to all three phase switches can be used, as appropriate. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of controlling a power inverter, comprising:
generating a set of pulse width modulation (PWM) signals for each of six space vectors, the set of pulse width modulation (PWM) signals comprising a set of three phase signals controlling a set of three phase switches connected across a DC power source;
configuring the set of pulse width modulation (PWM) signals to maintain at least one of the set of three phase signals to remain at a zero state for at least two consecutive modulation segments, each modulation segment comprising a plurality of clock cycles; and
generating a set of three phase alternating current (AC) outputs based on the set of six space vectors;
wherein generating the set of three-phase alternating voltage (AC) outputs comprises charging a set of bootstrap capacitors coupled to the set of three phase switches respectively driven by the set of three phase signals, the charging occurring during the at least one of the set of three phase signals remaining at the zero state for at least two consecutive modulation segments, each bootstrap capacitor having one leg connected directly to one side of the DC power source.

2. The method of claim 1, wherein the set of three phase signals comprises a set of three phase signals configured to be one hundred twenty degrees out of phase.

3. The method of claim 1, wherein the set of pulse width modulation (PWM) signals are encoded using a three-bit value.

4. The method of claim 1, further comprising transmitting the set of three-phase alternating voltage (AC) outputs to a load.

5. The method of claim 4, wherein the load comprises an electric motor.

6. The method of claim 5, wherein the electric motor comprises at least one of an alternating (AC) induction motor, brushless direct (DC) motor, a switched reluctance motor, or a permanent magnet synchronous motor.

7. The method of claim 1, wherein the at least two consecutive modulation segments comprises at least a portion of a third consecutive modulation segment.

8. The method of claim 1, wherein each modulation segment comprises five clock cycles, the at least one of the set of three phase signals to remain at the zero state for at least ten consecutive clock cycles.

9. The method of claim 8, wherein the at least one of the set of three phase signals to remain at the zero state for at least ten consecutive clock cycles remains at the zero state for more than ten consecutive clock cycles.

10. A system for controlling for a power inverter, comprising:
an interface to a set of three phase switches connected across a DC power source and to a load; and
a processor, communicating with the set of three phase switches and the load, the processor being configured to generate a set of pulse width modulation (PWM) signals for each of six pulse width modulation (PWM) vectors, the set of pulse width modulation (PWM) signals comprising a set of three phase signals controlling the set of three phase switches,
configuring the set of pulse width modulation (PWM) signals to maintain at least one of the set of three phase signals to remain at a zero state for at least two consecutive modulation segments, each modulation segment comprising a plurality of clock cycles,
generate a set of three phase alternating voltage (AC) outputs based on the set of six pulse width modulation vectors, and
transmit the set of three phase alternating voltage (AC) outputs to the load;
wherein generating the set of three-phase alternating voltage (AC) outputs comprises charging a set of bootstrap capacitors coupled to the set of three phase switches respectively driven by the set of three phase signals, the charging occurring during the at least one of the set of three phase signals remaining at the zero state for at least two consecutive modulation segments, each bootstrap capacitor having one leg coupled directly to one side of the DC power source.

11. The system of claim 10, wherein the set of three phase signals comprises a set of three phase signals configured to be one hundred twenty degrees out of phase.

12. The system of claim 10, wherein the set of pulse width modulation (PWM) signals are encoded using a three-bit value.

13. The system of claim 12, wherein the load comprises an electric motor.

14. The system of claim 13, wherein the electric motor comprises at least one of an alternating (AC) induction motor, brushless direct (DC) motor, a switched reluctance motor, or a permanent magnet synchronous motor.

15. The system of claim 10, wherein the at least two consecutive modulation segments comprises at least a portion of a third consecutive modulation segment.

16. A method of controlling an electric motor, comprising:
generating a set of pulse width modulation (PWM) signals for each of six pulse width modulation (PWM) vectors, the set of pulse width modulation (PWM) signals comprising a set of three phase signals controlling a set of three phase switches connected across a DC power source;
configuring the set of pulse width modulation (PWM) signals to maintain at least one of the set of three phase signals to remain at a zero state for at least two consecutive modulation segments, each modulation segment comprising a plurality of clock cycles; and
controlling an operation of the electric motor using a set of three phase alternating current (AC) outputs based on the set of six pulse width modulation vectors;
wherein generating the set of three-phase alternating voltage (AC) outputs comprises charging a set of bootstrap capacitors coupled to the set of three phase switches respectively driven by the set of three phase signals, the charging occurring during the at least one of the set of three phase signals remaining at the zero state for at least two consecutive modulation segments, each bootstrap capacitor having one leg coupled directly to one side of the DC power source.

* * * * *